US012683658B2

(12) United States Patent
Zhang et al.

(10) Patent No.: US 12,683,658 B2
(45) Date of Patent: Jul. 14, 2026

(54) CHANNEL STATE INFORMATION TRANSMISSION METHOD, CHANNEL STATE INFORMATION RECEPTION METHOD, SIGNALING INFORMATION TRANSMISSION METHOD, NODE, AND MEDIUM

(71) Applicant: ZTE CORPORATION, Guangdong (CN)

(72) Inventors: Shujuan Zhang, Guangdong (CN); Yijian Chen, Guangdong (CN); Zhaohua Lu, Guangdong (CN); Zhen He, Guangdong (CN); Guanghui Yu, Guangdong (CN)

(73) Assignee: ZTE Corporation (CN)

( * ) Notice: Subject to any disclaimer, the term of this patent is extended or adjusted under 35 U.S.C. 154(b) by 674 days.

(21) Appl. No.: 18/024,598

(22) PCT Filed: Aug. 27, 2021

(86) PCT No.: PCT/CN2021/114918
§ 371 (c)(1),
(2) Date: Dec. 14, 2023

(87) PCT Pub. No.: WO2022/048497
PCT Pub. Date: Mar. 10, 2022

(65) Prior Publication Data
US 2024/0120978 A1 Apr. 11, 2024

(30) Foreign Application Priority Data
Sep. 4, 2020 (CN) .......................... 202010921180.2

(51) Int. Cl.
*H04B 7/06* (2006.01)
*H04B 7/0456* (2017.01)
*H04W 72/232* (2023.01)

(52) U.S. Cl.
CPC ......... *H04B 7/0626* (2013.01); *H04B 7/0456* (2013.01); *H04W 72/232* (2023.01)

(58) Field of Classification Search
CPC .. H04B 7/0626; H04B 7/0456; H04W 72/232
See application file for complete search history.

(56) References Cited

U.S. PATENT DOCUMENTS

2013/0343216 A1 12/2013 Su
2013/0343299 A1* 12/2013 Sayana ................ H04B 7/0417
370/328
(Continued)

FOREIGN PATENT DOCUMENTS

CN 101789813 A 7/2010
CN 102255689 A 11/2011
(Continued)

OTHER PUBLICATIONS

Xiaomi., "Enhancements on multi-beam operation" 3GPP TSG RAN WG1 #102-e R1-2006540—e-Meeting, Aug. 17-28, 2020.
(Continued)

*Primary Examiner* — Won Tae C Kim
(74) *Attorney, Agent, or Firm* — KDW Firm PLLC

(57) ABSTRACT

Provided are a channel state information transmission method, a channel state information receiving method, a signaling information transmission method, a node and a medium. The channel state information sending method is applied to a first communication node and includes the following. M downlink measurement reference signal resources are determined, where M is a positive integer greater than 1; one set of channel state information is determined according to the M downlink measurement reference signal resources; and the one set of channel state information is sent.

16 Claims, 4 Drawing Sheets

Determine M downlink measurement reference signal resources, where M is a positive integer greater than 1 — S110

Determine one set of channel state information according to the M downlink measurement reference signal resources — S120

Send the set of channel state information — S130

(56) References Cited

U.S. PATENT DOCUMENTS

| | | | | |
|---|---|---|---|---|
| 2016/0143055 A1* | 5/2016 | Nammi | | H04B 7/0617 |
| | | | | 370/329 |
| 2016/0301511 A1* | 10/2016 | Yoon | | H04B 7/0413 |
| 2018/0034612 A1* | 2/2018 | Lin | | H04L 25/0224 |
| 2018/0278313 A1* | 9/2018 | Kim | | H04L 5/0048 |
| 2019/0334602 A1 | 10/2019 | Liu | | |
| 2023/0198725 A1* | 6/2023 | Abdelghaffar | | H04B 7/0626 |
| | | | | 370/252 |

FOREIGN PATENT DOCUMENTS

| | | | |
|---|---|---|---|
| CN | 103220068 A | 7/2013 | |
| CN | 103580739 A | 2/2014 | |
| CN | 103580779 A | 2/2014 | |
| CN | 105991231 A | 10/2016 | |
| CN | 108141317 A | 6/2018 | |
| CN | 111901003 A | 11/2020 | |
| CN | 112019463 A | 12/2020 | |
| CN | 113475128 A | 10/2021 | |
| EP | 3324550 A1 | 5/2018 | |
| WO | 2013176480 A1 | 11/2013 | |
| WO | 2013191503 A1 | 12/2013 | |
| WO | 2015124070 A1 | 8/2015 | |
| WO | 2020098685 A1 | 5/2020 | |

OTHER PUBLICATIONS

International Search Report for the International Application No. PCT/CN2021/114918, mailed 5 pages.

3GPP TSG-RAN WG2 #102, "RAN WGs progress on NR WI in the meeting Apr. 2018," NTT Docomo Inc (Rapporteur), R2-1806852, 10.1 organisational: 101 pages (May 2018) [Information].

Chinese Office Action and Search Report issued in CN Application No. 2020109211802, dated Mar. 18, 2024, 19 pages.

Indian Office Action for Application No. 202327052423 dated Aug. 17, 2023.

Extended European Search Report for EP Application No. 21863562.1, dated Aug. 27, 2024, 11 pages.

* cited by examiner

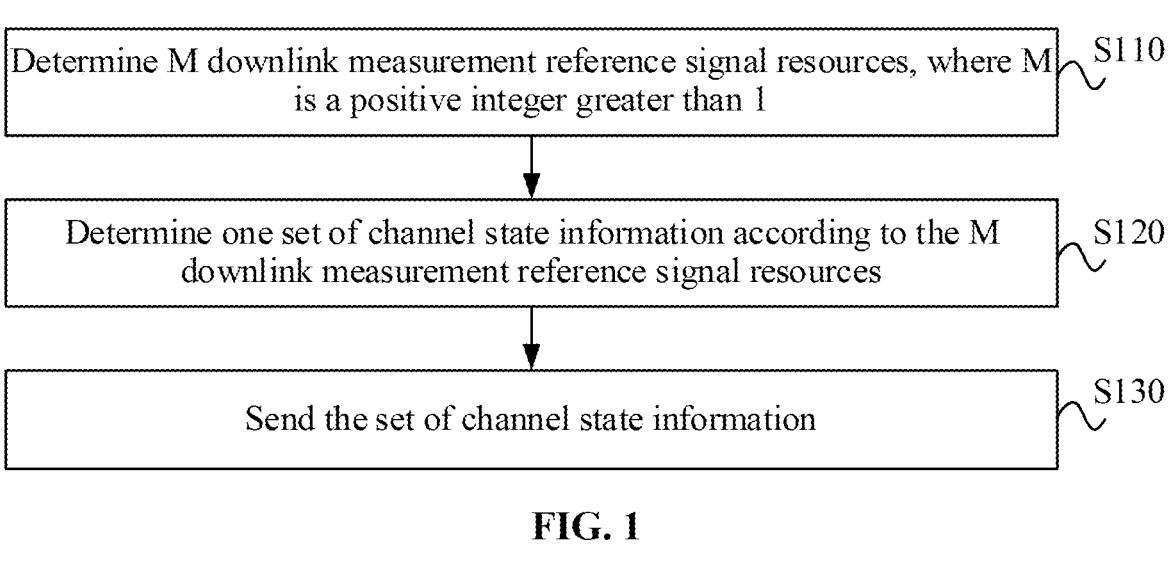

Determine M downlink measurement reference signal resources, where M is a positive integer greater than 1 ~S110

Determine one set of channel state information according to the M downlink measurement reference signal resources ~S120

Send the set of channel state information ~S130

FIG. 1

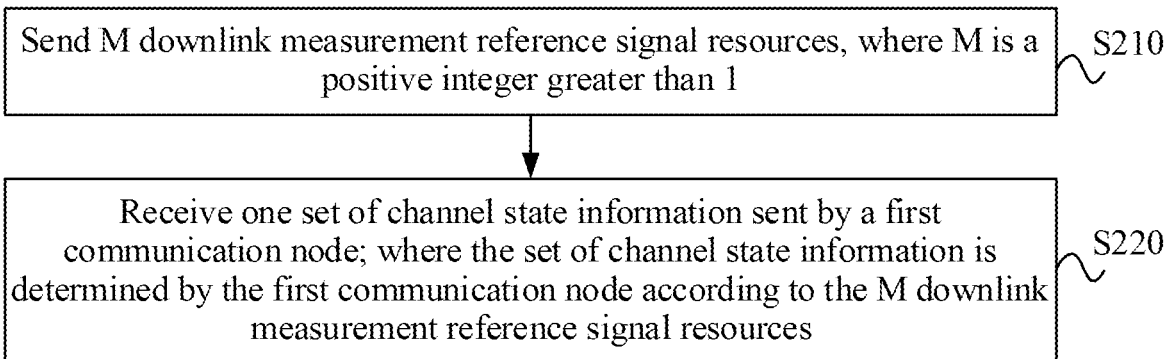

Send M downlink measurement reference signal resources, where M is a positive integer greater than 1 ~S210

Receive one set of channel state information sent by a first communication node; where the set of channel state information is determined by the first communication node according to the M downlink measurement reference signal resources ~S220

FIG. 2

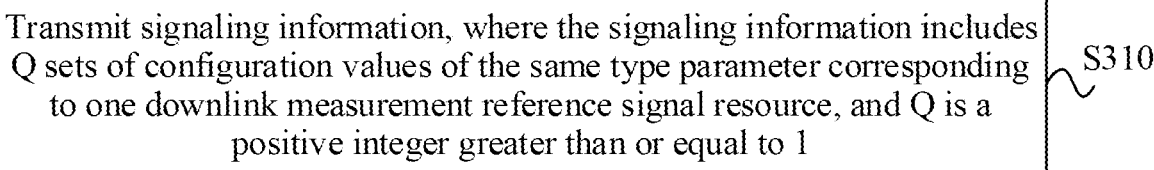

Transmit signaling information, where the signaling information includes Q sets of configuration values of the same type parameter corresponding to one downlink measurement reference signal resource, and Q is a positive integer greater than or equal to 1 ~S310

FIG. 3

CHANNEL STATE INFORMATION TRANSMISSION METHOD, CHANNEL STATE INFORMATION RECEPTION METHOD, SIGNALING INFORMATION TRANSMISSION METHOD, NODE, AND MEDIUM

CROSS-REFERENCES TO RELATED APPLICATIONS

This is a National Stage Application, filed under 35 U.S.C. 371, of International Patent Application No. PCT/CN2021/114918, filed on Aug. 27, 2021, which is based on and claims priority to Chinese Patent Application No. 202010921180.2 filed with the China National Intellectual Property Administration (CNIPA) on Sep. 4, 2020, the disclosure of which is incorporated herein by reference in its entirety.

TECHNICAL FIELD

The present application relates to the field of communication technologies, for example, to a channel state information sending method, a channel state information receiving method, a signaling information transmission method, a node and a medium.

BACKGROUND

Distributed multiple-input and multiple-output (MIMO), as an important research direction of future communication, has been widely concerned. Channel quality estimation in the MIMO scenario is mainly achieved based on the following. A terminal sends an uplink reference signal, and a base station acquires channel information, such as a channel quality indicator (CQI), based on the uplink reference signal; in this manner, channel quality estimation is completed.

However, the preceding technical means used for channel quality estimation cannot solve the technical problem in which uplink interference is inconsistent with downlink interference.

SUMMARY

The present application provides a channel state information sending method, a channel state information receiving method, a signaling information transmission method, a node and a medium. A first communication node uses multiple downlink measurement reference signal resources to perform channel measurement, so that the technical problem in which uplink interference is inconsistent with downlink interference is effectively solved when channel state information estimation is performed only according to an uplink measurement reference signal in distributed multiple-input and multiple-output (MIMO), and thus the accuracy of channel state estimation in distributed transmission is improved.

In a first aspect, the present application provides a channel state information sending method applied to a first communication node. The method includes the following.

M downlink measurement reference signal resources are determined, where M is a positive integer greater than 1; one set of channel state information is determined according to the M downlink measurement reference signal resources; and the one set of channel state information is sent.

In a second aspect, the present application further provides a signaling information transmission method. The method includes the following.

Signaling information is transmitted, where the signaling information includes Q sets of configuration values of the same type parameter corresponding to one downlink measurement reference signal resource, and Q is a positive integer greater than or equal to 1.

Through the preceding solution, Q sets of configuration values of the same type parameter are configured for one downlink measurement reference signal resource, so that the flexibility of resource configuration is improved, and the requirements of flexible configuration of multi-user (MU) transmission in distributed MIMO are satisfied.

In a third aspect, the present application further provides a channel state information receiving method applied to a second communication node. The method includes the following.

M downlink measurement reference signal resources are sent, where M is a positive integer greater than 1; and one set of channel state information sent by a first communication node is received; where the one set of channel state information is determined by the first communication node according to the M downlink measurement reference signal resources.

In a fourth aspect, the present application further provides a first communication node. The first communication node includes one or more processors.

The one or more processors, when executed, implement the method according to the first aspect or the second aspect of the present application.

In a fifth aspect, the present application further provides a second communication node. The second communication node includes one or more processors.

The one or more processors, when executed, implement the method according to the second aspect or the third aspect of the present application.

In a sixth aspect, the present application further provides a storage medium storing a computer program which, when executed by a processor, implements any method according to embodiments of the present application.

BRIEF DESCRIPTION OF DRAWINGS

FIG. 1 is a flowchart of a channel state information sending method according to the present application;

FIG. 2 is a flowchart of a channel state information receiving method according to the present application;

FIG. 3 is a flowchart of a signaling information transmission method according to the present application;

DETAILED DESCRIPTION

Figure 3A:
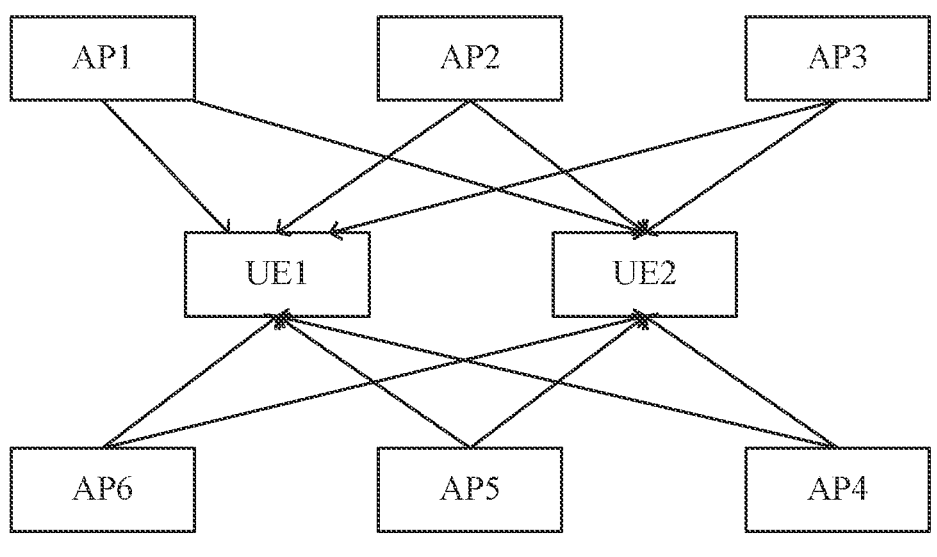
FIG. 3A is a diagram of a scene where channel state information is transmitted according to the present application.

Embodiments of the present application are described below in conjunction with drawings.

The steps illustrated in the flowcharts among the drawings may be performed by a computer system such as one set of computer-executable instructions. Moreover, although logical sequences are illustrated in the flowcharts, in some cases, the illustrated or described steps may be performed in sequences different from those described herein.

In an exemplary implementation, FIG. 1 is a flowchart of a channel state information sending method according to the present application. According to the channel state information sending method of the embodiment, a first communication node uses multiple downlink measurement reference signal resources to perform channel measurement, so that the technical problem in which uplink interference is inconsistent with downlink interference is effectively solved when channel state information estimation is performed only according to an uplink measurement reference signal in distributed multiple-input and multiple-output (MIMO), and thus the accuracy of channel state estimation in distributed transmission is improved. Moreover, the manner in which multiple first communication nodes share downlink measurement reference signals and power allocation characteristics and scheduling characteristics of distributed transmission are also taken into consideration, so that the channel state measurement is more accurate, the load of measurement reference signals is smaller, and the manner may be flexibly adapted to the multi-user (MU) scheduling strategy of distributed transmission. The method may be performed by a channel state information sending apparatus, which may be implemented by software and/or hardware and is integrated on a first communication node. The first communication node includes, but is not limited to, a user equipment (UE).

As shown in FIG. 1, a channel state information sending method provided in the present application includes the following.

In S110, M downlink measurement reference signal resources are determined, where M is a positive integer greater than 1.

Each downlink measurement reference signal resource of the M downlink measurement reference signal resources may be a measurement reference signal resource sent by a sending node or a group of sending nodes of a second communication node. The second communication node includes one or more sending nodes. A downlink measurement reference signal resource includes one or more downlink measurement reference signal ports. The content of the downlink measurement reference signal resource is not limited herein. Exemplarily, the downlink measurement reference signal resource includes, but is not limited to, a channel state information reference signal (CSI-RS) resource and/or a synchronization signal block (SSB) resource.

One set of channel state information includes at least one of: reference signal received power (RSRP), a signal-to-interference-plus-noise ratio (SINR), reference signal receiving quality (RSRQ), a channel quality indicator (CQI), a rank indicator (RI) or a precoding matrix indicator (PMI).

In an embodiment, a sending node of the second communication node may correspond to a downlink measurement reference signal resource; or a group of sending nodes of the second communication node may correspond to a CSI-RS resource.

In S120, one set of channel state information is determined according to the M downlink measurement reference signal resources.

In a case where the one set of channel state information is determined according to the downlink measurement reference signal resources, in the present application, a transmission mode of a physical downlink shared channel (PDSCH) may be determined based on a downlink measurement reference signal resource, and then the one set of channel state information is determined according to the transmission mode; in the present application, a transmission mode of a PDSCH may also be determined according to the downlink measurement reference signal resources and M pieces of power information, and then the one set of channel state information is obtained.

The strategy for determination is not limited in the embodiment, and those skilled in the art may perform determination according to actual situations.

In S130, the one set of channel state information is sent.

After the one set of channel state information is determined, the one set of channel state information may be sent in this step. For example, the one set of channel state information is sent to the second communication node or a central processing unit (CPU).

According to the channel state information sending method of the present application, one set of channel state information is effectively determined through M downlink measurement reference signal resources, so that the technical problem in which uplink interference is inconsistent with downlink interference is effectively solved when channel state information estimation is performed only according to an uplink measurement reference signal in distributed MIMO, and thus the accuracy of channel state estimation in distributed transmission is improved. Moreover, the manner in which multiple first communication nodes share downlink measurement reference signals and power allocation characteristics and scheduling characteristics of distributed transmission are also taken into consideration, so that the channel state measurement is more accurate, the load of measurement reference signals is smaller, and the manner may be flexibly adapted to the MU scheduling strategy of distributed transmission.

Based on the preceding embodiments, variant embodiments of the preceding embodiments are provided. For the brevity of description, only differences from the preceding embodiments are described in the variant embodiments.

In an embodiment, determining the one set of channel state information according to the M downlink measurement reference signal resources includes the following.

A transmission mode of a PDSCH is obtained according to the M downlink measurement reference signal resources, M precoding matrices and an RI value; and the one set of channel state information is determined according to the transmission mode of the PDSCH.

The M precoding matrices may be precoding matrices corresponding to the M downlink measurement reference signal resources. In the present application, a transmission mode of a PDSCH may be first determined according to the M downlink measurement reference signal resources, M precoding matrices and an RI value, and then the one set of channel state information is determined based on the determined transmission mode. The means for determining the one set of channel state information according to the transmission mode of the PDSCH is not limited here. The transmission mode of the PDSCH may represent a mapping relationship between layer data and port numbers.

In an embodiment, the transmission mode of the PDSCH satisfies one of following formulas:

$$
\begin{bmatrix}
y^{3000}(i) \\
\dots \\
y^{3000+P_1-1}(i) \\
y^{3000+P_1}(i) \\
\dots \\
y^{3000+P_1+P_2-1}(i) \\
\dots \\
y^{3000+\sum_{i=2}^{M}P_i-1}(i)
\end{bmatrix}
=
\begin{bmatrix}
W_1 \\
W_2 \\
\dots \\
W_M
\end{bmatrix}
\begin{bmatrix}
x^0(i) \\
\dots \\
x^{\nu-1}(i)
\end{bmatrix};
$$

$y^{3000+l}$ (where $$
l = 0, 1, \dots, \sum_{m=1}^{m} P_m - 1)
$$

denotes a PDSCH sent on antenna port 3000+l after precoding, and $y^{3000+l}$ (where l=

$$
l = \sum_{n=1}^{m-1} P_n, \sum_{n=1}^{m-1} P_n + 1, \dots, \sum_{n=1}^{m} P_n - 1)
$$

corresponds to $P_m$ antenna ports of downlink measurement reference signal resource m.

$$
\begin{bmatrix}
y_1^{3000}(i) \\
\dots \\
y_1^{3000+P_1-1}(i) \\
y_2^{3000}(i) \\
\dots \\
y_2^{3000+P_2-1}(i) \\
\dots \\
y_M^{3000+P_M}(i)
\end{bmatrix}
=
\begin{bmatrix}
W_1 \\
W_2 \\
\dots \\
W_M
\end{bmatrix}
\begin{bmatrix}
x^0(i) \\
\dots \\
x^{\nu-1}(i)
\end{bmatrix};
$$

$$
y_m^{3000+l}
$$

(where m=1, 2, . . . , M, and l=0, 1, . . . , $P_m$–1) denotes a PDSCH symbol sent on antenna port 3000+l corresponding to CSI-RS resource m after precoding.

$P_m$ (where m=1, 2, . . . , M) denotes the number of antenna ports of downlink measurement reference signal resource m, $W_m$ (where m=1, 2, . . . , M) denotes a precoding matrix corresponding to downlink measurement reference signal resource m, a dimension of $W_m$ (where m=1, 2, . . . , M) is $P_m * v$, $x^{a-1}(i)$ denotes layer data of an a-th layer of the PDSCH, a=1, 2, . . . , v, and v denotes the RI value.

In an embodiment, the channel state information is further obtained according to M pieces of power information, and each piece of power information corresponds to a respective one downlink measurement reference signal resource of the M downlink measurement reference signal resources.

Power information may be a power difference between energy per resource element (EPRE) of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource. The one downlink measurement reference signal resource is one downlink measurement reference signal resource of the M downlink measurement reference signal resources.

The one set of channel state information may also be determined according to M pieces of power information and the M downlink measurement reference signal resources.

In an embodiment, determining the one set of channel state information according to the M downlink measurement reference signal resources includes the following.

The one set of channel state information is obtained according to the M downlink measurement reference signal resources and M pieces of power information, where each piece of power information of the M pieces of power information corresponds to a respective one downlink measurement reference signal resource of the M downlink measurement reference signal resources.

In an embodiment, obtaining the one set of channel state information according to the M downlink measurement reference signal resources and the M pieces of power information includes the following.

A transmission mode of a PDSCH is obtained according to the M downlink measurement reference signal resources and the M pieces of power information; and the one set of channel state information is obtained according to the transmission mode of the PDSCH, where the transmission mode of the PDSCH satisfies one of following formulas:

$$
\begin{bmatrix}
y^{3000}(i) \\
\dots \\
y^{3000+P_1-1}(i) \\
y^{3000+P_1}(i) \\
\dots \\
y^{3000+P_1+P_2-1}(i) \\
\dots \\
y^{3000+\sum_{i=2}^{M}P_i-1}(i)
\end{bmatrix}
=
\begin{bmatrix}
\sqrt{\eta_1}\, W_1 \\
\sqrt{\eta_2}\, W_2 \\
\dots \\
\sqrt{\eta_M}\, W_M
\end{bmatrix}
\begin{bmatrix}
x^0(i) \\
\dots \\
x^{\nu-1}(i)
\end{bmatrix};
$$

$y^{3000+l}$ (where l=0, 1, . . . , $$
\sum_{n=1}^{M-1}
$$

$P_m$–1) denotes a PDSCH sent on antenna port 3000+l after precoding, and $y^{3000+l}$ (where l=

$$
\sum_{n=1}^{M-1}
$$

$P_n$, $$
\sum_{n=1}^{M-1} P_n
$$

$P_n$+1, . . . , $$
\sum_{n=1}^{m}
$$

$P_n-1$) corresponds to $P_m$ antenna ports of downlink measurement reference signal resource m.

$$\begin{bmatrix} y_1^{3000}(i) \\ \cdots \\ y_1^{3000+P_1-1}(i) \\ y_2^{3000}(i) \\ \cdots \\ y_2^{3000+P_2-1}(i) \\ \cdots \\ y_M^{3000+P_M}(i) \end{bmatrix} = \begin{bmatrix} \sqrt{\eta_1}\, W_1 \\ \sqrt{\eta_2}\, W_2 \\ \cdots \\ \sqrt{\eta_M}\, W_M \end{bmatrix} \begin{bmatrix} x^0(i) \\ \cdots \\ x^{v-1}(i) \end{bmatrix};$$

$$y_m^{3000+l}$$

(where m=1, 2, . . . , M, and l=0, 1, . . . , $P_m-1$) denotes a PDSCH symbol sent on antenna port 3000+l corresponding to CSI-RS resource m after precoding.

$P_m$ (where m=1, 2, . . . , M) denotes the number of antenna ports of downlink measurement reference signal resource m, $W_m$ (where m=1, 2, . . . , M) denotes a precoding matrix corresponding to downlink measurement reference signal resource m, a dimension of $W_m$ (where m=1, 2, . . . , M) is $P_m*v$, $x^{v-1}(i)$ denotes layer data of a v-th layer of the PDSCH, and $\sqrt{\eta_i}$ (where i=1, 2, . . . , M) denotes a power difference between energy per resource element (EPRE) of the PDSCH part on $P_i$ antenna ports of downlink measurement reference signal resource i and EPRE of downlink measurement reference signal resource i.

In an embodiment, the each piece of power information of the M pieces of power information includes at least one of: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource. The one downlink measurement reference signal resource is one downlink measurement reference signal resource of the M downlink measurement reference signal resources, the each piece of power information of the M pieces of power information corresponds to a respective one downlink measurement reference signal resource of the M downlink measurement reference signal resources, and the M pieces of power information are included in received first signaling information or are determined according to a predetermined rule.

In an embodiment, the M precoding matrices satisfy one of characteristics described below.

Elements in each column of each precoding matrix of the M precoding matrices are 1; each precoding matrix of the M precoding matrices is an identity matrix; the M precoding matrices are determined by the first communication node; each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

In an embodiment, the method further includes the following.

Second signaling information is received, where the second signaling information includes an acquisition manner of the M precoding matrices.

The second signaling information may be signaling information sent by the second communication node to the first communication node for indicating the acquisition manner of the M precoding matrices.

In an embodiment, determining the one set of channel state information according to the M downlink measurement reference signal resources includes the following.

A piece of channel measurement information is obtained according to each downlink measurement reference signal resource of the M downlink measurement reference signal resources; a sum value of M pieces of channel measurement information is obtained, where the M pieces of channel measurement information correspond to the M downlink measurement reference signal resources on a one-to-one basis; and the one set of channel state information is obtained according to the sum value of the M pieces of channel measurement information.

The means for obtaining the one set of channel state information according to the sum value of the M pieces of channel measurement information is not limited here.

A channel measurement value is obtained based on each downlink measurement reference signal, and then M channel measurement values are added to form a channel measurement sum value, that is, channel measurement information; and after the channel measurement information is obtained, one set of channel state information can be obtained in combination with an interference-and-noise measurement value. For example, RSRP and RSRQ are obtained according to the channel measurement sum value, or an SINR is obtained according to the channel measurement sum value and an interference measurement value. Optionally, a CQI value is obtained according to the SINR.

In an embodiment, determining the one set of channel state information according to the M downlink measurement reference signal resources includes the following.

$$\sum_{m=1}^{M}$$

$P_m$ downlink measurement reference signal ports are determined according to the M downlink measurement reference signal resources; and the one set of channel state information is obtained according to the $$\sum_{m=1}^{M}$$

$P_m$ downlink measurement reference signal ports; where $P_m$ denotes the number of downlink measurement reference signal ports of downlink measurement reference signal resource m, and the $$\sum_{m=1}^{M}$$

$P_m$ downlink measurement reference signal ports include downlink measurement reference signal ports in the M downlink measurement reference signal resources. A downlink measurement reference signal includes a CSI-RS and/or an SSB.

In an embodiment, any two downlink measurement reference signal resources of the M downlink measurement reference signal resources correspond to the same RI layer PDSCH data; columns of any two precoding matrices of the M precoding matrices correspond to the same RI layer PDSCH data; and any two precoding matrices of the M precoding matrices have the same number of columns; where RI layer PDSCH data refers to RI layer data of a PDSCH, and the PDSCH includes a PDSCH corresponding to the one set of channel state information.

In an embodiment, the one set of channel state information includes at least one of: a CQI, RSPR, RSRQ, an SINR, an RI or a PMI.

In an embodiment, the one set of channel state information includes more than one CQI, and the more than one CQI corresponds to different codewords.

In an embodiment, the M downlink measurement reference signal resources satisfy at least one of characteristics described below.

The M downlink measurement reference signal resources correspond to the same RI layer data; or the M downlink measurement reference signal resources correspond to the same RI, where the RI is a positive integer greater than or equal to 1.

In an embodiment, in a case where the one set of channel state information is determined, the M downlink measurement reference signal resources are all channel measurement resources.

In an embodiment, in a case where the one set of channel state information is determined, the M downlink measurement reference signal resources do not include an interference measurement resource.

In an embodiment, channel state information is determined based on a channel measurement resource and an interference measurement resource, the channel measurement resource and the interference measurement resource include the same downlink measurement reference signal resource, and the channel measurement resource and the interference measurement resource correspond to two sets of configuration values of the same type parameter of the same downlink measurement reference signal resource, respectively.

The two sets of configuration values of the same type parameter may be indicated by signaling information; alternatively, one set of configuration value of the two sets of configuration values may be notified by signaling information, and the other set of configuration value of the two sets of configuration values is obtained based on a predetermined rule. The same type parameter may include one of: power information or transmission configuration indicator (TCI) state information. In an exemplary implementation, the present application further provides a channel state information receiving method. FIG. 2 is a flowchart of a channel state information receiving method according to the present application. According to the method, the technical problem in which uplink interference is inconsistent with downlink interference is effectively solved when channel state information estimation is performed only according to an uplink measurement reference signal in distributed MIMO, and thus the accuracy of channel state estimation in distributed transmission is improved. Moreover, the manner in which multiple first communication nodes share downlink measurement reference signals and power allocation characteristics and scheduling characteristics of distributed transmission are also taken into consideration, so that the channel state measurement is more accurate, the load of measurement reference signals is smaller, and the manner can be flexibly adapted to the MU scheduling strategy of distributed transmission. The method may be performed by a channel state information reception apparatus, which may be implemented by software and/or hardware and is integrated on a second communication node. The second communication node includes, but is not limited to, an access point (AP). For the content not exhaustively listed in the embodiment, reference may be made to the preceding embodiments.

As shown in FIG. 2, a channel state information receiving method provided in the present application includes the following.

In S210, M downlink measurement reference signal resources are sent, where M is a positive integer greater than 1.

In S220, one set of channel state information sent by a first communication node is received; where the one set of channel state information is determined by the first communication node according to the M downlink measurement reference signal resources.

According to the channel state information receiving method provided in the present application, the technical problem in which uplink interference is inconsistent with downlink interference is effectively solved when channel state information estimation is performed only according to an uplink measurement reference signal in distributed MIMO, and thus the accuracy of channel state estimation in distributed transmission is improved. Moreover, the manner in which multiple first communication nodes share downlink measurement reference signals and power allocation characteristics and scheduling characteristics of distributed transmission are also taken into consideration, so that the channel state measurement is more accurate, the load of measurement reference signals is smaller, and the manner can be flexibly adapted to the MU scheduling strategy of distributed transmission.

Based on the preceding embodiments, variant embodiments of the preceding embodiments are provided. For the brevity of description, only differences from the preceding embodiments are described in the variant embodiments.

In an embodiment, the one set of channel state information is determined by the first communication node according to a transmission mode of a PDSCH obtained according to the M downlink measurement reference signal resources, M precoding matrices corresponding to the M downlink measurement reference signal resources and an RI value.

In an embodiment, the M precoding matrices satisfy one of characteristics described below.

Elements in each column of each precoding matrix of the M precoding matrices are 1; each precoding matrix of the M precoding matrices is an identity matrix; the M precoding matrices are determined by the first communication node; each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

In an embodiment, the method further includes the following.

Second signaling information is sent, where the second signaling information includes an acquisition manner of the M precoding matrices.

In an embodiment, the one set of channel state information is determined by the first communication node according to the M downlink measurement reference signal resources and M pieces of power information, where each piece of power information of the M pieces of power information corresponds to a respective one downlink measurement reference signal resource of the M downlink measurement reference signal resources.

In an embodiment, the method further includes the following.

First signaling information is sent, where the first signaling information includes one or more pieces of power information of the M pieces of power information. Power information includes at least one piece of following information: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource. The one downlink measurement reference signal resource is one downlink measurement reference signal resource of the M downlink measurement reference signal resources, and each piece of power information of the M pieces of power information corresponds to a respective one downlink measurement reference signal resource of the M downlink measurement reference signal resources.

In an embodiment, the method further includes the following.

A demodulation reference signal (DMRS) port is sent to the first communication node according to the one set of channel state information, where the demodulation reference signal port and the M downlink measurement reference signal resources satisfy a quasi co-location relationship.

In an embodiment, the one set of channel state information is determined by the first communication node according to the M downlink measurement reference signal resources. The method for the first communication node to determine the one set of channel state information includes the following.

$$\sum_{m=1}^{M}$$

$P_m$ downlink measurement reference signal ports are determined according to the M downlink measurement reference signal resources; and the one set of channel state information is obtained according to the $$\sum_{m=1}^{M}$$

$P_m$ downlink measurement reference signal ports; where $P_m$ denotes the number of downlink measurement reference signal ports of downlink measurement reference signal resource m, and the $$\sum_{m=1}^{M}$$

$P_m$ downlink measurement reference signal ports include downlink measurement reference signal ports in the M downlink measurement reference signal resources. For example, a downlink measurement reference signal includes a CSI-RS and/or an SSB.

In an exemplary implementation, the present application further provides a signaling information transmission method. FIG. 3 is a flowchart of a signaling information transmission method according to the present application. The method is applicable to the case of indicating Q sets of configuration values of the same type parameter corresponding to one downlink measurement reference signal resource. The signaling information transmission scheme fully considers power allocation characteristics and scheduling characteristics of distributed transmission, so that the channel state measurement is more accurate and the MU scheduling strategy of distributed transmission can be flexibly adapted to. The method may be performed by a signaling information transmission apparatus provided in the present application, which may be implemented by software and/or hardware and integrated on a communication node. If the signaling information transmission method is a signaling information sending method, the communication node may be a second communication node; if the signaling information transmission method is a signaling information receiving method, the communication node may be a first communication node.

As shown in FIG. 3, the signaling information transmission method provided in the present application includes the following.

In S310, signaling information is transmitted, where the signaling information includes Q sets of configuration values of the same type parameter corresponding to one downlink measurement reference signal resource, and Q is a positive integer greater than or equal to 1.

The signaling information may be used for indicating Q sets of configuration values of the same type parameter corresponding to one downlink measurement reference signal resource.

Transmitting signaling information refers to sending signaling information or receiving signaling information. In the case of sending signaling information, the method may be performed by a second communication node. In the case of receiving signaling information, the method may be performed by a first communication node.

The content of the configuration value is not limited in the embodiment. Exemplarily, the configuration value includes one of: a time domain resource, a frequency domain resource, a time-frequency resource or a downlink measurement reference signal port group.

The same type parameter is not limited in the embodiment, for example, may be the same type parameter which needs a configuration value. Exemplarily, the same type parameter includes, but is not limited to, one of: power information or TCI state information. According to the signaling information transmission method provided in the present application, Q sets of configuration values of the same type parameter corresponding to one downlink measurement reference signal resource are effectively determined.

Based on the preceding embodiments, variant embodiments of the preceding embodiments are provided. For the brevity of description, only differences from the preceding embodiments are described in the variant embodiments.

In an embodiment, the Q sets of configuration values correspond to one of following of the one downlink measurement reference signal resource: Q time domain resources, Q frequency domain resources, Q time-frequency resources or Q downlink measurement reference signal port groups. In an embodiment, Q is equal to two, and two sets of configuration values correspond to a value of the same type parameter in a case where the one downlink measurement reference signal resource serves as a channel measurement resource and a value of the same type parameter in a case where the one downlink measurement reference signal resource serves as an interference measurement resource, respectively.

In an embodiment, the signaling information is a medium access control control element (MAC-CE).

In an embodiment, the same type parameter includes one of: power information or transmission configuration indicator state information.

In an embodiment, the power information includes at least one of: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource.

An exemplary description of the present application is made below.

In the related art, channel quality estimation is performed mainly based on that a terminal sending an uplink reference signal and a base station acquires channel information. However, this technical solution cannot solve the technical problems in which uplink interference is inconsistent with downlink interference and a relatively large interaction delay and a relatively large interaction amount between an access point (AP) and a CPU. To solve the preceding technical problems, the present application adopts the technical solution described below. According to the solution, the technical problem in which uplink interference is inconsistent with downlink interference is effectively solved when channel state information estimation is performed only according to an uplink measurement reference signal in distributed MIMO, and thus the accuracy of channel state estimation in distributed transmission is improved. Moreover, the manner in which multiple first communication nodes share downlink measurement reference signals and power allocation characteristics and scheduling characteristics of distributed transmission are also taken into consideration, so that the channel state measurement is more accurate, the load of measurement reference signals is smaller, and the manner can be flexibly adapted to the MU scheduling strategy of distributed transmission.

Embodiment One

In the embodiment, the terminal obtains one set of channel state information according to M downlink measurement reference signal resources. A downlink measurement reference signal resource includes at least a CSI-RS resource and/or an SSB resource, and the one set of channel state information includes at least one of: RSRP, an SINR, RSRQ, a CQI, an RI or a PMI; M is a positive integer greater than 1.

In an embodiment, the one set of channel state information includes at least one of: RSRP, an SINR, RSRQ, a CQI, an RI or a PMI. That is, the one set of channel state information includes a piece of RSRP, and/or an SINR, and/or a piece of RSRQ, and/or a CQI, and/or an RI, and/or a PMI.

Alternatively, in a case where the one set of channel state information includes more than one CQI, the more than one CQI are CQIs corresponding to different codewords. For example, in a case where the RI (that is, v) is less than a predetermined value, only one CQI value is fed back; in a case where the RI is greater than or equal to a predetermined value, two CQIs are fed back; different CQIs correspond to different codewords.

In the distributed MIMO scenario, multiple APs and the CPU are linked by wire (or wireless), and all APs simultaneously serve all UEs; and it is not excluded that part of the APs are determined as serving APs for each UE. FIG. 3A is a diagram of a scene where channel state information is transmitted according to the present application, and FIG. 3B is a diagram of another scene where channel state information is transmitted according to the present application. As shown in FIG. 3A, six APs (that is, six sending nodes of the second communication node) send downlink signals to UE1 and UE2 on the same time-frequency resource. Six APs and two UEs are shown in FIG. 3A. The scene shown in FIG. 3A is only an example, and the embodiment does not exclude other application examples.

In view of this, the following signal model may be established:

$$r_k = \sum_{m=1}^{M} h_{km} w_{km} \sqrt{\eta_{km}}\, s_k + \sum_{m=1}^{M} \sum_{i=1, i \neq k}^{K} h_{km} w_{im} \sqrt{\eta_{im}}\, s_i. \quad (1)$$

$r_k$ denotes a received signal at user k, $h_{km}$ denotes a channel coefficient between user k and AP m, $w_{im}$ denotes a precoding matrix added to signal $s_i$ of user i at AP m, $\sqrt{\eta_{im}}$ denotes power information added to signal $s_i$ of user i at AP m, $s_i$ denotes a signal of user i, M denotes the number of APs (for example, M=6 in FIG. 3A), and K denotes the number of users (for example, K=2 in FIG. 3A). In practice, M may be a number greater than or equal to 2.

$$\sum_{i=1}^{K}$$

$\eta_{im} \le 1$, and $\forall m = 1, 2, \ldots, M$, that is, total transmission power of each AP is less than or equal to 1.

When each AP sends a CSI-RS resource, a CSI-RS resource includes one or more CSI-RS ports. The terminal obtains a {CQI, RI} based on multiple CSI-RS resources, and the terminal feeds back the obtained {CQI, RI} to the CPU. The CPU controls the scheduling of six APs and two UEs in FIG. 3A. It can be seen from formula (1) that the CSI-RS measurement reference signal in this CSI-RS resource is an AP-Specific reference signal. The CPU wants both UE1 and UE2 to use the AP-Specific reference signal to perform measurement and feed back the respective {CQI, RI}; however, it can be seen from formula (1) that in order for both UE1 and UE2 to accurately measure the CQI, different power information $\eta_{im}$ applied to each UE at each AP needs to be considered. Therefore, the scheme described below may be adopted.

Multiple CSI-RS resources are configured for a terminal, and the terminal obtains a CQI based on the multiple CSI-RS resources as shown in FIG. 3B, where the CQI is obtained based on the following formula:

$$\begin{bmatrix} y^{3000}(i) \\ \cdots \\ y^{3000+P_1-1}(i) \\ y^{3000+P_1}(i) \\ \cdots \\ y^{3000+P_1+P_2-1}(i) \\ \cdots \\ y^{3000+\Sigma_{i=2}^{M}P_i-1}(i) \end{bmatrix} = \begin{bmatrix} W_1 \\ W_2 \\ \cdots \\ W_M \end{bmatrix} \begin{bmatrix} x^0(i) \\ \cdots \\ x^{v-1}(i) \end{bmatrix}. \tag{2}$$

$P_i$ denotes the number of CSI-RS ports of CSI-RS resource i, $W_m$ denotes a precoding matrix corresponding to CSI-RS resource m, and $W_m$ denotes a $P_m*v$ matrix. It is assumed that a power difference between EPRE of a PDSCH on port $$\left[ y^{3000+\Sigma_{l=1}^{m-1}P_l} \cdots y^{3000+\Sigma_{l=1}^{m}P_l} \right]$$

and EPRE of CSI-RS resource m is $P_{c,m}$, and each CSI-RS resource is separately configured with the power difference between the EPRE of a PDSCH corresponding to the each CSI-RS resource and the EPRE of the each CSI-RS resource. Thus, when the CQI is calculated, power differences corresponding to different CSI-RS resources are different. Moreover, this power difference is not a power difference between the EPRE of the PDSCH on all ports of the PDSCH corresponding to the CQI and the CSI-RS resource, but a power difference between the EPRE of the PDSCH on part of ports of the PDSCH and the CSI-RS resource. The PDSCH is the PDSCH corresponding to the CQI, that is, for example, the PDSCH on a channel state information (CSI) reference resource; that is, the CQI is obtained based on the following formula:

$$\begin{bmatrix} y^{3000}(i) \\ \cdots \\ y^{3000+P_1-1}(i) \\ y^{3000+P_1}(i) \\ \cdots \\ y^{3000+P_1+P_2-1}(i) \\ \cdots \\ y^{3000+\Sigma_{i=2}^{M}P_i-1}(i) \end{bmatrix} = \begin{bmatrix} \sqrt{\eta_1}\,W_1 \\ \sqrt{\eta_2}\,W_2 \\ \cdots \\ \sqrt{\eta_M}\,W_M \end{bmatrix} \begin{bmatrix} x^0(i) \\ \cdots \\ x^{v-1}(i) \end{bmatrix}. \tag{3}$$

$\sqrt{\eta_m}$ denotes the power difference between the EPRE of the PDSCH configured in the CSI-RS resource m and the EPRE of the CSI-RS resource. It can be seen from formula (2) that when the CQI is obtained, the M CSI-RS resources are all channel measurement resources, and the M CSI-RS resources do not include an interference measurement resource. The M CSI-RS resources correspond to the same RI layer data (that is, v-th layer data). For example, the RI layer data, after being precoded, may be transmitted in any one or more resources of the M CSI-RS resources, each CSI-RS resource of the M CSI-RS resources corresponds to the RI layer data, and the RI layer data is transmitted in each CSI-RS resource.

In the preceding description, one CSI-RS resource corresponds to one AP, and it is not excluded in this embodiment that one AP group corresponds to one CSI-RS resource.

Figure 3B:
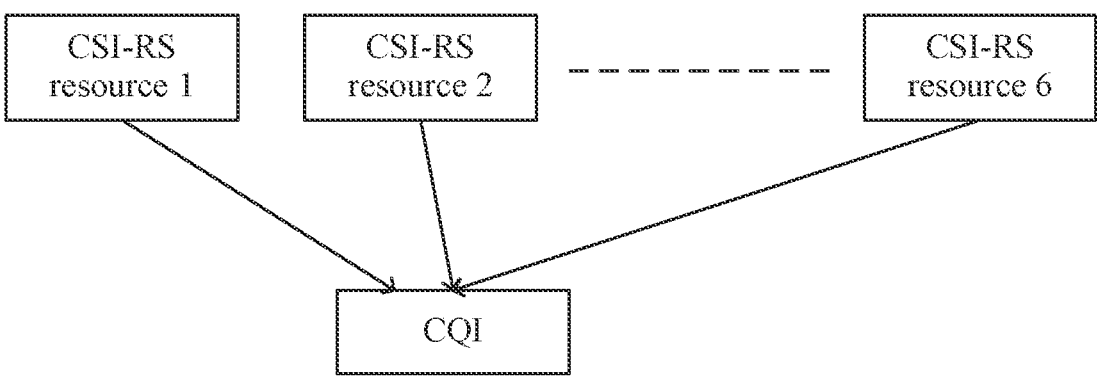
FIG. 3B is a diagram of another scene where channel state information is transmitted according to the present application.

In FIG. 3B, the base station configures multiple CSI-RS resources for the terminal, and the terminal only feeds back a CQI based on the multiple CSI-RS resources and does not feed back a PMI and an RI. When the CQI is calculated, it is assumed that $W_m$ is an identity matrix, or is based on precoding selected by the terminal. Alternatively, the acquisition manner of $W_m$ configured by the base station is based on an identity matrix or based on precoding selected by the terminal, or $W_m$ is predetermined only based on the selection by the terminal. Alternatively, when the CSI-RS resource includes a single port, $W_m$ is acquired based on the selection by the terminal; when the CSI-RS resource includes more than one CSI-RS port, $W_m$ is obtained based on an identity matrix. In FIG. 3B, the terminal does not select the CSI-RS resource configured by the base station, that is, the terminal does not feed back a channel state information reference signal (CSI-RS) resource indicator (CRI) in the multiple CSI-RS resources, and obtains the CQI based on the multiple CSI-RS resources configured by the base station. In FIG. 3B, the terminal feeds back the CQI based on the multiple CSI-RS resources configured by the base station. W is obtained only based on CSI-RS resource m and is not co-selected based on the multiple CSI-RS resources. For example, CSI-RS resource m is port 1, the channel obtained based on port 1 of CSI-RS resource m is $\hat{h}_{km}$, and then $W_m = \hat{h}_{km}*$. When the number of ports of CSI-RS resource m is greater than one, that is, the channel obtained based on the multiple ports of CSI-RS resource m is $\hat{h}_{km}$, then $W_m$ denotes right eigenvectors corresponding to the maximum RI eigenvalues after singular value decomposition (SVD) is performed on $R=E(\hat{h}_{km}*\hat{h}_{km})$, that is, $R=UDV'$, and $W=V(:,1:RI)$; that is, $W_m$ denotes RI eigenvectors corresponding to the maximum RI eigenvalues after SVD is performed on a correlation matrix of $\hat{h}_{km}$. $\hat{h}_{km}$ is a $R_X*P_m$ matrix, and $R_X$ is a receive beam.

In another implementation of the embodiment, the terminal feeds back the CQI and the RI based on multiple CSI-RS resources configured by the base station, and the one set of CQI and RI values are obtained based on the multiple CSI-RS resources.

Port numbers on the left of equal signs in formula (2) and formula (3) are uniformly numbered according to the CSI-RS resources and port numbers in the CSI-RS resources, that is, the port number of a CSI-RS port in a CSI-RS resource is dependent on an index of the CSI-RS resource and a port number in the CSI-RS resource. For example, if both CSI-RS resource 1 and CSI-RS resource 2 are ports 1, then port numbers of CSI-RS resource 1 and CSI-RS resource 2 are 3000 and 3001 respectively.

In another implementation of the embodiment, formula (2) is changed to following formula (2-1):

$$\begin{bmatrix} y_1^{3000}(i) \\ \cdots \\ y_1^{3000+P_1-1}(i) \\ y_2^{3000}(i) \\ \cdots \\ y_2^{3000+P_2-1}(i) \\ \cdots \\ y_M^{3000+P_M}(i) \end{bmatrix} = \begin{bmatrix} W_1 \\ W_2 \\ \cdots \\ W_M \end{bmatrix} \begin{bmatrix} x^0(i) \\ \cdots \\ x^{v-1}(i) \end{bmatrix}. \tag{2-1}$$

$$\left[ y_m^{3000}\, y_m^{3001} \cdots y_m^{3000+P_m} \right]$$

denotes PDSCH symbols sent on $P_m$ ports [3000, 3001, . . . , $P_m$] of CSI-RS resource m. Formula (3) is changed to following formula (3-1):

$$
\begin{bmatrix}
y_1^{3000}(i) \\
\cdots \\
y_1^{3000+P_1-1}(i) \\
y_2^{3000}(i) \\
\cdots \\
y_2^{3000+P_2-1}(i) \\
\cdots \\
y_M^{3000+P_M}(i)
\end{bmatrix}
=
\begin{bmatrix}
\sqrt{\eta_1}\, W_1 \\
\sqrt{\eta_2}\, W_2 \\
\cdots \\
\sqrt{\eta_M}\, W_M
\end{bmatrix}
\begin{bmatrix}
x^0(i) \\
\cdots \\
x^{v-1}(i)
\end{bmatrix}.
\qquad (3\text{-}1)
$$

In the preceding formula, the start number of antenna port numbers after precoding on the left of the equal sign is 3000, and the embodiment does not exclude other start antenna port numbers. When the CQI is calculated, if a dedicated interference measurement resource is configured, the interference is measured on the dedicated interference measurement resource; if no dedicated interference measurement resource is configured, the interference is independently calculated based on each CSI-RS resource, and then the interference is added. For example, the interference is obtained based on formula (4):

$$
I = \sum_{m=1}^{M} \left( r_m - \hat{h}_m(W_m)\sqrt{\eta_m} \right).
\qquad (4)
$$

$r_m$ denotes a received signal on CSI-RS resource m, and $\hat{h}_m$ denotes channel estimation obtained based on CSI-RS resource m. For example, $$
\hat{h}_m = \frac{y_m}{s_m},
$$

where $s_m$ denotes a CSI-RS on CSI-RS resource m.

When an RSRP/RSRQ/SINR value is obtained based on M downlink measurement reference signal resources, a RSRP/RSRQ/SINR value is first obtained based on each downlink measurement reference signal resource of the M downlink measurement reference signal resources, and then a sum value of M RSRP/RSRQ/SINR values is obtained; the sum value is included in the one set of channel state information and reported to the base station. Alternatively, a channel measurement value is obtained according to each downlink measurement reference resource of the M downlink measurement reference signal resources, M channel measurement values are added to obtain a sum value of the channel measurement values, then an interference-and-noise measurement value is obtained, and the channel state information is obtained according to the quotient of a sum value of the channel measurement values and the interference-and-noise measurement value. For example, the channel state information includes: an SINR, RSRQ and a CQI; or the sum value of the M measurement values is directly included in the channel state information; for example, the channel state information includes RSRP.

After the terminal feeds back one set of channel state information based on multiple downlink measurement reference signal resources, the CPU side or a control unit may use multiple APs to simultaneously send the same layer of demodulation reference signal (DMRS) data, and the DMRS and the multiple downlink measurement reference signal resources satisfy a quasi co-location relationship.

Embodiment Two

In the embodiment, the base station configures a CSI-RS resource for the terminal, and in the CSI-RS resource, relative power difference information between EPRE of a PDSCH and EPRE of the CSI-RS resource is configured in the CSI-RS resource. The relative power difference information is different on different frequency domain resource sets. For example, a physical resource block (PRB) set occupied by the CSI-RS resource is divided into Y PRB sets, and the power difference information is separately configured for the Y PRB sets; or the relative power difference information is allocated to the first PRB set, and difference information between a relative power difference between EPRE of a PDSCH corresponding to another PRB set and the EPRE of the CSI-RS resource and the relative power difference corresponding to the first PRB set, that is, the difference between relative power differences corresponding to the first PRB set and the another PRB set, is configured to the another PRB set.

According to signaling information or a predetermined rule, the PRB set occupied by the CSI-RS resource is divided into Y PRB sets; for example, the signaling information notifies division information of the PRB set, or it is predetermined that each successive X PRBs in the CSI-RS resource forms one PRB set, and a total of $Y = \lceil N/X \rceil$ PRB sets exist. N denotes a PRB span occupied by the CSI-RS resource, that is, the CSI-RS resource occupies a subcarrier in each PRB of N PRBs, or the CSI-RS resource occupies a subcarrier in each two PRBs of N PRBs.

It is mainly considered that if the CSI-RS resource is an AP-specific CSI-RS resource, in different PRB sets, power information allocated to UE1 is different due to different numbers of users served by the AP.

In the preceding case, different frequency domain positions of one CSI-RS resource correspond to different power information, and the embodiment does not exclude that different time domain resources of one CSI-RS resource correspond to different power information, or different time-frequency resources of one CSI-RS resource correspond to different power information.

In the preceding case, different power information is configured for different resources of one CSI-RS resource, and similarly, different TCI state information may also be configured for different resources of one CSI-RS resource. The TCI state includes quasi co-location reference signal information of the one CSI-RS resource.

Embodiment Three

In the embodiment, the base station configures CSI-RS resources for the terminal, each CSI-RS resource includes multiple CSI-RS ports, and different port groups correspond to different power and TCI states, that is, different TCI state configuration.

For example, one CSI-RS resource includes A CSI-RS ports, the A CSI-RS ports are divided into B CSI-RS port groups, and each port group is separately configured with a power difference between EPRE of a PDSCH corresponding to the each port group and EPRE of the each CSI-RS port group.

In an embodiment, each port group is separately configured with a corresponding TCI state. The TCI state includes one or more quasi co-location reference signals, each quasi co-location reference signal is associated with a type of quasi co-location parameter, and ports in the port group and the one or more quasi co-location reference signals satisfy a quasi co-location relationship with respect to the quasi co-location parameter. The quasi co-location parameter includes at least one of: a Doppler shift, a Doppler spread, an average delay, a delay spread or a spatial Rx parameter.

Embodiment Four

In the embodiment, the MAC-CE configures power information for one CSI-RS resource. The power information includes at least one of: a power difference between EPRE of a PDSCH and EPRE of the one CSI-RS resource or a power difference between the one CSI-RS resource and a synchronization signal.

Embodiment Five

In the embodiment, the base station configures a channel measurement resource and an interference measurement resource for the terminal. The channel measurement resource and the interference measurement resource correspond the same CSI-RS resource, only power information corresponding to the channel measurement resource is different from power information corresponding to the interference measurement resource.

For example, the base station configures CSI-RS resource 1 for the terminal, and frequency domain information, code domain information and port information of the CSI-RS resource are configured in CSI-RS resource 1. The base station configures relative power of two PDSCHs and the CSI-RS resource in CSI-RS resource 1. Relative power 1, that is, $\eta_1$, denotes a power difference between a target PDSCH and CSI-RS resource 1, and relative power 2, that is, $\eta_2$, denotes a power difference between an interference PDSCH and CSI-RS resource 1. For example, if channel estimation obtained based on CSI-RS resource 1 is $\hat{h}$, then target channel energy is $|\sqrt{\eta_1}\hat{h}|^2$, and interference channel energy is $|\sqrt{\eta_2}\hat{h}|^2$.

In the preceding embodiment, power information of a downlink measurement reference signal resource includes at least one of: a power difference between EPRE of a PDSCH and EPRE of the CSI-RS resource or a power difference between the CSI-RS resource and a synchronization signal.

Figure 4:
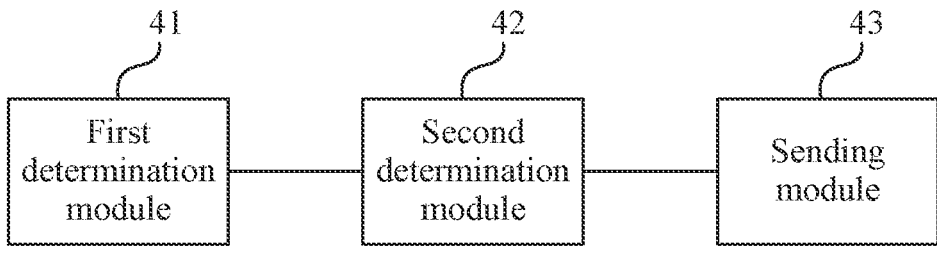
FIG. 4 is a structural diagram of a channel state information sending apparatus according to the present application.

In an exemplary implementation, the present application provides a channel state information sending apparatus. FIG. 4 is a structural diagram of a channel state information sending apparatus according to the present application. The apparatus may be configured at a first communication node, and as shown in FIG. 4, the apparatus includes a first determination module 41, a second determination module 42 and a sending module 43. The first determination module 41 is configured to determine M downlink measurement reference signal resources, where M is a positive integer greater than 1. The second determination module 42 is configured to determine one set of channel state information according to the M downlink measurement reference signal resources. The sending module 43 is configured to send the one set of channel state information. The channel state information sending apparatus provided in the embodiment is configured to implement the channel state information sending method of the embodiments shown in FIG. 1. The channel state information sending apparatus provided in the embodiment has similar implementation principles and technical effects to the channel state information sending method provided in the embodiments of the present application, which will not be repeated here.

Based on the preceding embodiments, variant embodiments of the preceding embodiments are provided. For the brevity of description, only differences from the preceding embodiments are described in the variant embodiments.

In an embodiment, the second determination module 42 is configured to obtain a transmission mode of a PDSCH according to the M downlink measurement reference signal resources, M precoding matrices and an RI value; and determine the one set of channel state information according to the transmission mode of the PDSCH.

In an embodiment, the transmission mode of the PDSCH satisfies one of following formulas:

$$\begin{bmatrix} y^{3000}(i) \\ \dots \\ y^{3000+P_1-1}(i) \\ y^{3000+P_1}(i) \\ \dots \\ y^{3000+P_1+P_2-1}(i) \\ \dots \\ y^{3000+\sum_{i=2}^{M}P_i-1}(i) \end{bmatrix} = \begin{bmatrix} W_1 \\ W_2 \\ \dots \\ W_M \end{bmatrix} \begin{bmatrix} x^0(i) \\ \dots \\ x^{\nu-1}(i) \end{bmatrix};$$

$y^{3000+l}$ (where $$l = 0, 1, \dots, \sum_{m=1}^{m} P_m - 1)$$

denotes a PDSCH sent on antenna port 3000+l after precoding, and $y^{3000+l}$ (where $$l = \sum_{n=1}^{m-1} P_n, \sum_{n=1}^{m-1} P_n + 1, \dots, \sum_{n=1}^{m} P_n - 1)$$

corresponds to $P_m$ antenna ports of downlink measurement reference signal resource m.

$$\begin{bmatrix} y_1^{3000}(i) \\ \dots \\ y_1^{3000+P_1-1}(i) \\ y_2^{3000}(i) \\ \dots \\ y_2^{3000+P_2-1}(i) \\ \dots \\ y_M^{3000+P_M}(i) \end{bmatrix} = \begin{bmatrix} W_1 \\ W_2 \\ \dots \\ W_M \end{bmatrix} \begin{bmatrix} x^0(i) \\ \dots \\ x^{\nu-1}(i) \end{bmatrix};$$

$$y_m^{3000+l}$$

(where m=1, 2, . . . , M, and l=0, 1, . . . , $P_m$–1) denotes a PDSCH symbol sent on antenna port 3000+l corresponding to CSI-RS resource m after precoding.

$P_m$ (where m=1, 2, . . . , M) denotes the number of antenna ports of downlink measurement reference signal resource m, $W_m$ (where m=1, 2, . . . , M) denotes a precoding matrix corresponding to downlink measurement reference signal resource m, a dimension of W m (where m=1, 2, . . . , M)

is $P_m{}^*v$, $x^{a-1}(i)$ denotes layer data of an a-th layer of the PDSCH, a=1, 2, . . . , v, and v denotes the RI value.

In an embodiment, the channel state information is further obtained according to M pieces of power information, and each piece of power information of the M pieces of power information corresponds to a respective one downlink measurement reference signal resource of the M downlink measurement reference signal resources.

In an embodiment, the second determination module 42 is configured to obtain the one set of channel state information according to the M downlink measurement reference signal resources and M pieces of power information, where each piece of power information of the M pieces of power information corresponds to a respective one downlink measurement reference signal resource of the M downlink measurement reference signal resources.

In an embodiment, the second determination module 42 obtaining the one set of channel state information according to the M downlink measurement reference signal resources and the M pieces of power information includes the following. A transmission mode of a PDSCH is obtained according to the M downlink measurement reference signal resources and the M pieces of power information; and the one set of channel state information is obtained according to the transmission mode of the PDSCH, where the transmission mode of the PDSCH satisfies one of following formulas:

$$
\begin{bmatrix} y^{3000}(i) \\ \dots \\ y^{3000+P_1-1}(i) \\ y^{3000+P_1}(i) \\ \dots \\ y^{3000+P_1+P_2-1}(i) \\ \dots \\ y^{3000+\sum_{i=2}^{M}P_i-1}(i) \end{bmatrix} = \begin{bmatrix} \sqrt{\eta_1}\,W_1 \\ \sqrt{\eta_2}\,W_2 \\ \dots \\ \sqrt{\eta_M}\,W_M \end{bmatrix} \begin{bmatrix} x^0(i) \\ \dots \\ x^{v-1}(i) \end{bmatrix};
$$

$y^{3000+l}$ (where $$
\sum_{m=1}^{M}
$$

denotes a PDSCH sent on antenna port 3000+l after precoding, and $y^{3000+l}$ (where $$
l = \sum_{n=1}^{m-1}P_n, \sum_{n=1}^{m-1}P_n + 1, \dots , \sum_{n=1}^{m}P_n - 1\bigg)
$$

corresponds to $P_m$ antenna ports of downlink measurement reference signal resource m.

$$
\begin{bmatrix} y_1^{3000}(i) \\ \dots \\ y_1^{3000+P_1-1}(i) \\ y_2^{3000}(i) \\ \dots \\ y_2^{3000+P_2-1}(i) \\ \dots \\ y_M^{3000+P_M}(i) \end{bmatrix} = \begin{bmatrix} \sqrt{\eta_1}\,W_1 \\ \sqrt{\eta_2}\,W_2 \\ \dots \\ \sqrt{\eta_M}\,W_M \end{bmatrix} \begin{bmatrix} x^0(i) \\ \dots \\ x^{v-1}(i) \end{bmatrix};
$$

$y_m^{3000+l}$ (where m=1, 2, . . . , M, and l=0, 1, . . . , $P_m$−1) denotes a PDSCH symbol sent on antenna port 3000+l corresponding to CSI-RS resource m after precoding.

$P_m$ (where m=1, 2, . . . , M) denotes the number of antenna ports of downlink measurement reference signal resource m, $W_m$ (where m=1, 2, . . . , M) denotes a precoding matrix corresponding to downlink measurement reference signal resource m, a dimension of $W_m$ (where m=1, 2, . . . , M) is $P_m{}^*v$, $x^{v-1}(i)$ denotes layer data of a v-th layer of the PDSCH, and $\sqrt{\eta_i}$ (where i=1, 2, . . . , M) denotes a power difference between EPRE of the PDSCH part on $P_i$ antenna ports of downlink measurement reference signal resource i and EPRE of downlink measurement reference signal resource i.

In an embodiment, the each piece of power information of the M pieces of power information includes at least one of: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource. The one downlink measurement reference signal resource is one downlink measurement reference signal resource of the M downlink measurement reference signal resources, the each piece of power information of the M pieces of power information corresponds to a respective one downlink measurement reference signal resource of the M downlink measurement reference signal resources, and the M pieces of power information are included in received first signaling information or are determined according to a predetermined rule.

In an embodiment, the M precoding matrices satisfy one of characteristics described below.

Elements in each column of each precoding matrix of the M precoding matrices are 1; each precoding matrix of the M precoding matrices is an identity matrix; the M precoding matrices are determined by the first communication node; each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

In an embodiment, the apparatus further includes a third determination module. The third determination module is configured to receive second signaling information, where the second signaling information includes an acquisition manner of the M precoding matrices.

In an embodiment, the second determination module 42 is configured to obtain a piece of channel measurement information according to each downlink measurement reference signal resource of the M downlink measurement reference signal resources; obtain a sum value of M pieces of channel measurement information, where the M pieces of channel measurement information correspond to the M downlink measurement reference signal resources on a one-to-one basis; and obtain the one set of channel state information according to the sum value of the M pieces of channel measurement information.

In an embodiment, determining the one set of channel state information according to the M downlink measurement reference signal resources includes the following.

$$\sum\nolimits_{m=1}^{M} P_m$$

$P_m$ CSI-RS ports are determined according to the M downlink measurement reference signal resources; and the one set of channel state information is obtained according to the $$\sum\nolimits_{m=1}^{M} P_m$$

$P_m$ CSI-RS ports; where $P_m$ denotes the number of CSI-RS ports of downlink measurement reference signal resource m, and the $$\sum\nolimits_{m=1}^{M} P_m$$

$P_m$ CSI-RS ports include downlink measurement reference signal ports in the M CSI-RS resources.

In an embodiment, any two downlink measurement reference signal resources of the M downlink measurement reference signal resources correspond to the same RI layer PDSCH data; columns of any two precoding matrices of the M precoding matrices correspond to the same RI layer PDSCH data; and any two precoding matrices of the M precoding matrices have the same number of columns; where RI layer PDSCH data refers to RI layer data of a PDSCH, and the PDSCH includes a PDSCH corresponding to the one set of channel state information.

In an embodiment, the one set of channel state information includes at least one of: a CQI, RSPR, RSRQ, an SINR, an RI or a PMI.

In an embodiment, the one set of channel state information includes more than one CQI, and the more than one CQI corresponds to different codewords.

In an embodiment, the M downlink measurement reference signal resources satisfy at least one of characteristics described below.

The M downlink measurement reference signal resources correspond to the same RI layer data; or the M downlink measurement reference signal resources correspond to the same RI; where the RI is a positive integer greater than or equal to 1.

In an embodiment, in a case where the one set of channel state information is determined, the M downlink measurement reference signal resources are all channel measurement resources.

In an embodiment, in a case where the one set of channel state information is determined, the M downlink measurement reference signal resources do not include an interference measurement resource.

In an embodiment, channel state information is determined based on a channel measurement resource and an interference measurement resource, the channel measurement resource and the interference measurement resource include the same downlink measurement reference signal resource, and the channel measurement resource and the interference measurement resource correspond to two sets of configuration values of the same type parameter of the same downlink measurement reference signal resource, respectively.

Figure 5:
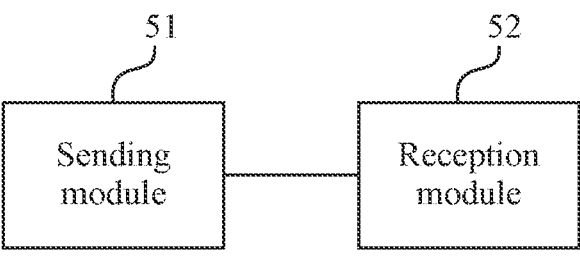
FIG. 5 is a structural diagram of a channel state information reception apparatus according to the present application.

In an exemplary implementation, the present application provides a channel state information reception apparatus. FIG. 5 is a structural diagram of a channel state information reception apparatus according to the present application. The apparatus may be configured at a second communication node, and as shown in FIG. 5, the apparatus includes a sending module 51 and a reception module 52. The sending module 51 is configured to send M downlink measurement reference signal resources, where M is a positive integer greater than 1. The reception module 52 is configured to receive one set of channel state information sent by a first communication node; where the one set of channel state information is determined by the first communication node according to the M downlink measurement reference signal resources.

The channel state information reception apparatus provided in the embodiment is configured to implement the channel state information receiving method of the embodiments of the present application. The channel state information reception apparatus provided in the embodiment has similar implementation principles and technical effects to the channel state information receiving method provided in the embodiments of the present application, which will not be repeated here. Based on the preceding embodiments, variant embodiments of the preceding embodiments are provided. For the brevity of description, only differences from the preceding embodiments are described in the variant embodiments.

In an embodiment, the one set of channel state information is determined by the first communication node according to a transmission mode of a PDSCH obtained according to the M downlink measurement reference signal resources, M precoding matrices corresponding to the M downlink measurement reference signal resources and an RI value.

In an embodiment, the M precoding matrices satisfy one of characteristics described below.

Each element in each column of each precoding matrix of the M precoding matrices is 1; each precoding matrix of the M precoding matrices is an identity matrix; the M precoding matrices are determined by the first communication node; each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

In an embodiment, the apparatus further includes a second signaling information sending module. The second signaling information sending module is configured to send second signaling information, where the second signaling information includes an acquisition manner of the M precoding matrices.

In an embodiment, the one set of channel state information is determined by the first communication node according to the M downlink measurement reference signal resources and M pieces of power information, where each piece of power information of the M pieces of power information corresponds to a respective one downlink measurement reference signal resource of the M downlink measurement reference signal resources.

In an embodiment, the apparatus further includes a first signaling information sending module. The first signaling information sending module is configured to send first signaling information, where the first signaling information includes one or more pieces of power information of the M pieces of power information. Power information includes at least one piece of following information: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource. The one downlink measurement reference signal resource is one downlink measurement reference signal resource of the M downlink measurement reference signal resources, and each piece of power information of the M pieces of power information corresponds to a respective one downlink measurement reference signal resource of the M downlink measurement reference signal resources.

In an embodiment, the method further includes the following.

A demodulation reference signal port is sent to the first communication node according to the one set of channel state information, where the demodulation reference signal port and the M downlink measurement reference signal resources satisfy a quasi co-location relationship.

In an embodiment, the one set of channel state information is determined by the first communication node according to the M downlink measurement reference signal resources. The method for the first communication node to determine the one set of channel state information includes the following.

$$\sum_{m=1}^{M} P_m$$

$P_m$ downlink measurement reference signal ports are determined according to the M downlink measurement reference signal resources; and the one set of channel state information is obtained according to the $$\sum_{m=1}^{M} P_m$$

$P_m$ downlink measurement reference signal ports; where $P_m$ denotes the number of downlink measurement reference signal ports of downlink measurement reference signal resource m, and the $$\sum_{m=1}^{M} P_m$$

$P_m$ downlink measurement reference signal ports include downlink measurement reference signal ports in the M downlink measurement reference signal resources. A downlink measurement reference signal includes a CSI-RS and/or an SSB.

Figure 6:
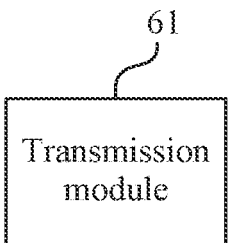
FIG. 6 is a structural diagram of a signaling information transmission apparatus according to the present application.

In an exemplary implementation, the present application provides a signaling information transmission apparatus. FIG. 6 is a structural diagram of a signaling information transmission apparatus according to the present application, and the apparatus may be integrated on a communication node. In a case where signaling information transmission is signaling information sending, the apparatus is integrated on a second communication node; in a case where signaling information transmission is signaling information reception, the apparatus is integrated on a first communication node. As shown in FIG. 6, the apparatus includes a transmission module 61. The transmission module 61 is configured to transmit signaling information, where the signaling information includes Q sets of configuration values of the same type parameter corresponding to one downlink measurement reference signal resource, and Q is a positive integer greater than or equal to 1.

The signaling information transmission apparatus provided in the embodiment is configured to implement the signaling information transmission method of the embodiments of the present application. The signaling information transmission apparatus provided in the embodiment has similar implementation principles and technical effects to the signaling information transmission method of the embodiments of the present application, which will not be repeated here.

Based on the preceding embodiments, variant embodiments of the preceding embodiments are provided. For the brevity of description, only differences from the preceding embodiments are described in the variant embodiments.

In an embodiment, the Q sets of configuration values correspond to one of following of the one downlink measurement reference signal resource: Q time domain resources, Q frequency domain resources, Q time-frequency resources or Q downlink measurement reference signal port groups. In an embodiment, Q is equal to two, and two sets of configuration values correspond to a value of the same type parameter in a case where the one downlink measurement reference signal resource serves as a channel measurement resource and a value of the same type parameter in a case where the one downlink measurement reference signal resource serves as an interference measurement resource, respectively.

In an embodiment, the signaling information is a MAC-CE.

In an embodiment, the same type parameter includes one of: power information or transmission configuration indicator state information.

In an embodiment, the power information includes at least one of: a power difference between EPRE of a PDSCH and EPRE of one downlink measurement reference signal resource; a power difference between one downlink measurement reference signal resource and a synchronization signal; or a power difference between EPRE corresponding to part of ports of a PDSCH and EPRE of one downlink measurement reference signal resource, where the part of the ports of the PDSCH correspond to antenna ports of the one downlink measurement reference signal resource.

Figure 7:
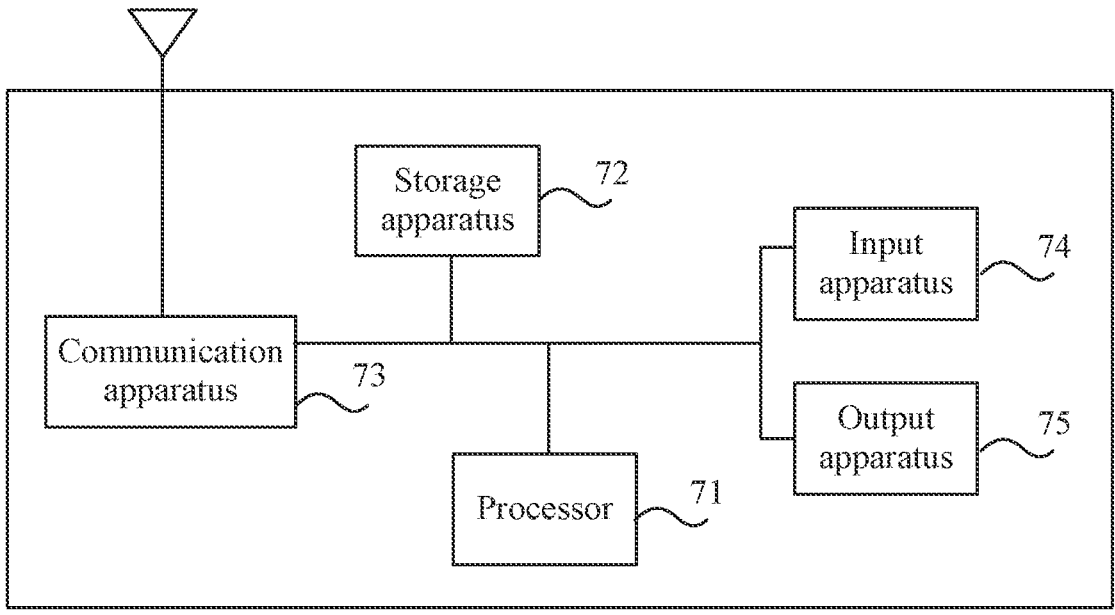
FIG. 7 is a structural diagram of a first communication node according to the present application.

In an exemplary implementation, an embodiment of the present application further provides a first communication node, and FIG. 7 is a structural diagram of a first communication node according to the present application. As shown in FIG. 7, the first communication node provided in the present application includes one or more processors 71 which, when executed, implement the signaling information transmission method provided in any embodiment of the present application and the channel state information sending method provided in any embodiment of the present application.

The first communication node may further include a storage apparatus 72. One or more processors 71 may be provided in the first communication node, and one processor 71 is used as an example in FIG. 7. The storage apparatus 72 is configured to store one or more programs which, when executed by the one or more processors 71, cause the one or more processors 71 to implement the signaling information transmission method and the channel state information sending method according to the embodiments of the present application.

The first communication node further includes a communication apparatus 73, an input apparatus 74 and an output apparatus 75.

The processor 71, the storage apparatus 72, the communication apparatus 73, the input apparatus 74 and the output apparatus 750 in the first communication node may be connected via a bus or other means, with connection via a bus as an example in FIG. 7.

The input apparatus 74 may be configured to receive input digital or character information and to generate key signal input related to user settings and function control of the first communication node. The output apparatus 75 may include a display device such as a display screen.

The communication apparatus 73 may include a receiver and a sender. The communication apparatus 73 is configured to perform information transceiving communication under the control of the processor 71.

As a computer-readable storage medium, the storage apparatus 72 may be configured to store software programs and computer-executable programs and modules, such as program instructions/modules (for example, the transmission module 61 in the signaling information transmission apparatus; for another example, the first determination module 41, the second determination module 42 and the sending module 43 in the channel state information sending apparatus) corresponding to the signaling information transmission method and the channel state information sending method according to the embodiments of the present application. The storage apparatus 72 may include a program storage area and a data storage area. The program storage area may store an operating system and an application program required by at least one function. The data storage area may store data created depending on use of the first communication node. Additionally, the storage apparatus 72 may include a high-speed random-access memory and may further include a nonvolatile memory, such as at least one disk memory, a flash memory or another nonvolatile solid-state memory. In some examples, the storage apparatus 72 may include memories which are remotely disposed with respect to the processor 71. These remote memories may be connected to the first communication node via a network. Examples of the preceding network include, but are not limited to, the Internet, an intranet, a local area network, a mobile communication network and a combination thereof.

Figure 8:
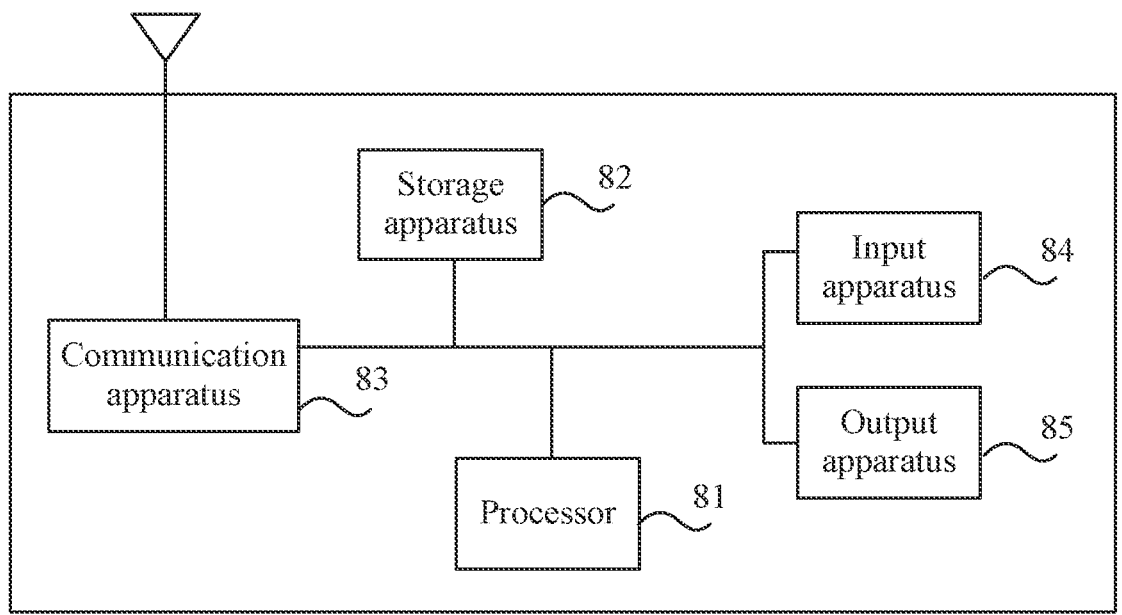
FIG. 8 is a structural diagram of a second communication node according to the present application.

In an exemplary implementation, an embodiment of the present application further provides a second communication node. FIG. 8 is a structural diagram of a second communication node according to the present application. As shown in FIG. 8, the second communication node provided in the present application includes one or more processors 81 which, when executed, implement the signaling information transmission method provided in any embodiment of the present application and the channel state information receiving method provided in any embodiment of the present application.

The second communication node may further include a storage apparatus 82. One or more processors 81 may be provided in the second communication node, and one processor 81 is used as an example in FIG. 8. The storage apparatus 82 is configured to store one or more programs which, when executed by the one or more processors 81, cause the one or more processors 81 to implement the signaling information transmission method and the channel state information receiving method according to the embodiments of the present application.

The second communication node further includes a communication apparatus 83, an input apparatus 84 and an output apparatus 85.

The processor 81, the storage apparatus 82, the communication apparatus 83, the input apparatus 84 and the output apparatus 85 in the second communication node may be connected via a bus or other means, with connection via a bus as an example in FIG. 8.

The input apparatus 84 may be configured to receive input digital or character information and to generate key signal input related to user settings and function control of the second communication node. The output apparatus 85 may include a display device such as a display screen.

The communication apparatus 83 may include a receiver and a sender. The communication apparatus 83 is configured to perform information transceiving communication under the control of the processor 81.

As a computer-readable storage medium, the storage apparatus 82 may be configured to store software programs and computer-executable programs and modules, such as program instructions/modules (for example, the transmission module in the signaling information transmission apparatus; for another example, the sending module 51 and the reception module 52 in the channel state information reception apparatus) corresponding to the signaling information transmission method and the channel state information receiving method according to the embodiments of the present application. The storage apparatus 82 may include a program storage area and a data storage area. The program storage area may store an operating system and an application program required by at least one function. The data storage area may store data created depending on use of the second communication node. Additionally, the storage apparatus 82 may include a high-speed random-access memory and may further include a nonvolatile memory, such as at least one disk memory, a flash memory, or another nonvolatile solid-state memory. In some examples, the storage apparatus 82 may include memories which are remotely disposed with respect to the processor 81. These remote memories may be connected to the second communication node via a network. Examples of the preceding network include, but are not limited to, the Internet, an intranet, a local area network, a mobile communication network and a combination thereof.

An embodiment of the present application further provides a storage medium. The storage medium stores a computer program which, when executed by a processor, implements any method according to the present application. The storage medium stores a computer program which, when executed by a processor, implements the channel state information sending method according to any embodiment of the present application, the channel state information receiving method according to any embodiment of the present application and the signaling information transmission method according to any embodiment of the present application.

The channel state information sending method includes the following.

M downlink measurement reference signal resources are determined, where M is a positive integer greater than 1; one set of channel state information is determined according to the M downlink measurement reference signal resources; and the one set of channel state information is sent.

The channel state information receiving method includes the following.

M downlink measurement reference signal resources are sent, where M is a positive integer greater than 1; and one set of channel state information sent by a first communication node is received; where the one set of channel state information is determined by the first communication node according to the M downlink measurement reference signal resources.

The signaling information transmission method includes the following.

Signaling information is transmitted, where the signaling information includes Q sets of configuration values of the same type parameter corresponding to one downlink measurement reference signal resource, and Q is a positive integer greater than or equal to 1.

A computer storage medium in the embodiment of the present application may adopt any combination of one or more computer-readable media. The computer-readable media may be computer-readable signal media or computer-readable storage media. A computer-readable storage medium may be, for example, but is not limited to, an electrical, magnetic, optical, electromagnetic, infrared, or semiconductor system, apparatus, or device, or any combination thereof. Examples of the computer-readable storage medium include (a non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc ROM (CD-ROM), an optical memory device, a magnetic memory device, or any suitable combination thereof. The computer-readable storage medium may be any tangible medium including or storing a program. The program may be used by or used in conjunction with an instruction execution system, apparatus or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal or any suitable combination thereof. The computer-readable signal medium may also be any computer-readable medium other than the computer-readable storage medium. The computer-readable medium may send, propagate or transmit a program used by or used in conjunction with an instruction execution system, apparatus or device. The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any type of network including a local area network (LAN) or a wide area network (WAN) or may be connected to an external computer (for example, via the Internet through an Internet service provider).

The term user terminal encompasses any appropriate type of wireless user device such as a mobile phone, a portable data processing apparatus, a portable web browser or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology such as, but not limited to, a read-only memory (ROM), a random-access memory (RAM) or an optical memory device and system (a digital video disc (DVD) or a compact disc (CD)). Computer-readable media may include non-transitory storage media. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on multi-core processor architecture.

What is claimed is:

1. A channel state information sending method, applied to a first communication node, comprising:

determining M downlink measurement reference signal resources, wherein M is a positive integer greater than 1, and the M downlink measurement reference signal resources are all channel measurement resources;

determining one set of channel state information according to the M downlink measurement reference signal resources; and sending the one set of channel state information, wherein the determining the one set of channel state information according to the M downlink measurement reference signal resources comprises:

obtaining the one set of channel state information according to the M downlink measurement reference signal resources and M pieces of power information;

wherein the each piece of power information of the M pieces of power information comprises:

a power difference between energy per resource element (EPRE) corresponding to part of ports of a first physical downlink shared channel (PDSCH) and EPRE of one downlink measurement reference signal resource, wherein the part of the ports of the first PDSCH correspond to antenna ports of the one downlink measurement reference signal resource; and wherein the one downlink measurement reference signal resource is one downlink measurement reference signal resource of the M downlink measurement reference signal resources, the each piece of power information of the M pieces of power information corresponds to a respective one downlink measurement reference signal resource of the M downlink measurement reference signal resources, and the M pieces of power information are comprised in received first signaling information or are determined according to a predetermined rule.

2. The method according to claim 1, wherein the determining the one set of channel state information according to the M downlink measurement reference signal resources comprises:

obtaining a transmission mode of a second PDSCH according to the M downlink measurement reference signal resources, M precoding matrices and a rank indicator (RI) value; and determining the one set of channel state information according to the transmission mode of the second PDSCH.

3. The method according to claim 2, wherein the transmission mode of the second PDSCH satisfies the following formula:

$$\begin{bmatrix} y_1^{3000}(i) \\ \cdots \\ y_1^{3000+P_1-1}(i) \\ y_2^{3000}(i) \\ \cdots \\ y_2^{3000+P_2-1}(i) \\ \cdots \\ y_M^{3000+P_M}(i) \end{bmatrix} = \begin{bmatrix} W_1 \\ W_2 \\ \cdots \\ W_M \end{bmatrix} \begin{bmatrix} x^0(i) \\ \cdots \\ x^{v-1}(i) \end{bmatrix};$$

wherein $$y_m^{3000+l}$$

denotes a PDSCH symbol sent on antenna port 3000+l corresponding to channel state information reference signal (CSI-RS) resource m after precoding, wherein m=1, 2, . . . , M and l=0, 1, . . . , $P_m$−1; wherein $P_m$ denotes a number of antenna ports of the downlink measurement reference signal resource m when m=1, 2, . . . , M, $W_m$ denotes a precoding matrix corresponding to the downlink measurement reference signal resource m when m=1, 2, . . . , M, a dimension of $W_m$ is $P_m$*v when m=1, 2, . . . , M, $x^{a-1}(i)$ denotes layer data of an a-th layer of the second PDSCH, a=1, 2, . . . , v, and v denotes the RI value.

4. The method according to claim 2, wherein the one set of channel state information is obtained further according to M pieces of power information.

5. The method according to claim 2, wherein the M precoding matrices satisfy one of following characteristics:

elements in each column of each precoding matrix of the M precoding matrices are 1;

each precoding matrix of the M precoding matrices is an identity matrix;

the M precoding matrices are determined by the first communication node, wherein the first communication node is a communication node sending the one set of channel state information;

each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

6. The method according to claim 1, wherein the obtaining the one set of channel state information according to the M downlink measurement reference signal resources and the M pieces of power information comprises:

obtaining a transmission mode of a third PDSCH according to the M downlink measurement reference signal resources and the M pieces of power information; and obtaining the one set of channel state information according to the transmission mode of the third PDSCH, wherein the transmission mode of the third PDSCH satisfies the following formula:

$$\begin{bmatrix} y_1^{3000}(i) \\ \cdots \\ y_1^{3000+P_1-1}(i) \\ y_2^{3000}(i) \\ \cdots \\ y_2^{3000+P_2-1}(i) \\ \cdots \\ y_M^{3000+P_M}(i) \end{bmatrix} = \begin{bmatrix} \sqrt{\eta_1}\,W_1 \\ \sqrt{\eta_2}\,W_2 \\ \cdots \\ \sqrt{\eta_M}\,W_M \end{bmatrix} \begin{bmatrix} x^0(i) \\ \cdots \\ x^{v-1}(i) \end{bmatrix};$$

where $$y_m^{3000+l}$$

denotes a PDSCH symbol sent on antenna port 3000+l corresponding to CSI-RS resource m after precoding, wherein m=1, 2, . . . , M and l=0, 1, . . . , $P_m$−1; wherein $P_m$ denotes a number of antenna ports of downlink measurement reference signal resource m when m=1, 2, . . . , M, $W_m$ denotes a precoding matrix corresponding to the downlink measurement reference signal resource m when m=1, 2, . . . , M, a dimension of $W_m$ is $P_m$*V, $x^{v-1}(i)$ denotes layer data of a v-th layer of the third PDSCH when m=1, 2, . . . , M, and when i=1, 2, . . . , M, $\sqrt{\eta_i}$ denotes a power difference between EPRE of the third PDSCH part on $P_i$ antenna ports of downlink measurement reference signal resource i and EPRE of downlink measurement reference signal resource i.

7. The method according to claim 1, wherein the determining the one set of channel state information according to the M downlink measurement reference signal resources comprises:

respectively obtaining one piece of channel measurement information according to each downlink measurement reference signal resource of the M downlink measurement reference signal resources;

obtaining a sum value of M pieces of channel measurement information, wherein the M pieces of channel measurement information correspond to the M down-link measurement reference signal resources on a one-to-one basis; and obtaining the one set of channel state information according to the sum value of the M pieces of channel measurement information.

8. The method according to claim 1, wherein the one set of channel state information comprises at least one of:

a channel quality indicator (CQI), reference signal received power (RSRP), reference signal receiving quality (RSRQ), a signal-to-interference-plus-noise ratio (SINR), an RI, or a precoding matrix indicator (PMI).

9. The method according to claim 1, wherein the M downlink measurement reference signal resources satisfy at least one of following characteristics:

the M downlink measurement reference signal resources correspond to same RI layer data;

the M downlink measurement reference signal resources correspond to a same RI; or any two precoding matrices of the M precoding matrices have a same number of columns;

wherein the RI is a positive integer greater than or equal to 1.

10. A non-transitory storage medium storing a computer program which, when executed by a processor, implements the method according to claim 1.

11. A channel state information receiving method, applied to a second communication node, comprising:

sending M downlink measurement reference signal resources, wherein M is a positive integer greater than 1; and receiving one set of channel state information sent by a first communication node;

wherein the one set of channel state information is determined by the first communication node according to the M downlink measurement reference signal resources;

wherein the one set of channel state information is determined by the first communication node according to the M downlink measurement reference signal resources and M pieces of power information;

wherein the method further comprises:

sending first signaling information, wherein the first signaling information comprises at least one piece of power information of the M pieces of power information;

wherein each piece of power information of the M pieces of power information comprises:

a power difference between energy per resource element (EPRE) corresponding to part of ports of a first physical downlink shared channel (PDSCH) and EPRE of one downlink measurement reference signal resource, wherein the part of the ports of the first PDSCH correspond to antenna ports of the one downlink measurement reference signal resource; and wherein the one downlink measurement reference signal resource is one downlink measurement reference signal resource of the M downlink measurement reference signal resources, and each piece of power information of the M pieces of power information corresponds to a respective one downlink measurement reference signal resource of the M downlink measurement reference signal resources.

12. The method according to claim 11, wherein the one set of channel state information is determined by the first communication node according to a transmission mode of a second PDSCH, wherein the transmission mode of the second PDSCH is obtained by the first communication node according to the M downlink measurement reference signal resources, M precoding matrices corresponding to the M downlink measurement reference signal resources and a rank indicator (RI) value.

13. The method according to claim 12, wherein the M precoding matrices satisfy one of following characteristics:

elements in each column of each precoding matrix of the M precoding matrices are 1;

each precoding matrix of the M precoding matrices is an identity matrix;

the M precoding matrices are determined by the first communication node;

each precoding matrix of the M precoding matrices is obtained according to a respective one downlink measurement reference signal resource of the M downlink measurement reference signal resources; or each precoding matrix of the M precoding matrices is obtained according to the M downlink measurement reference signal resources.

14. The method as claimed in claim 12, wherein the transmission mode of the second PDSCH satisfies the following formula:

$$\begin{bmatrix} y_1^{3000}(i) \\ \cdots \\ y_1^{3000+P_1-1}(i) \\ y_2^{3000}(i) \\ \cdots \\ y_2^{3000+P_2-1}(i) \\ \cdots \\ y_M^{3000+P_M}(i) \end{bmatrix} = \begin{bmatrix} W_1 \\ W_2 \\ \cdots \\ W_M \end{bmatrix} \begin{bmatrix} x^0(i) \\ \cdots \\ x^{v-1}(i) \end{bmatrix};$$

where $$y_m^{3000+l}$$

denotes a PDSCH symbol sent on antenna port 3000+l corresponding to channel state information reference signal, CSI-RS, resource m after precoding when m=1, 2, . . . , M and l=0, 1, . . . , $P_m$−1;

wherein $P_m$ denotes a number of antenna ports of the downlink measurement reference signal resource m when m=1, 2, . . . , M, $W_m$ denotes a precoding matrix corresponding to the downlink measurement reference signal resource m when m=1, 2, . . . , M, a dimension of $W_m$ is $P_m$*v when m=1, 2, . . . , M, $x^{a-1}(i)$ denotes layer data of an a-th layer of the second PDSCH, a=1, 2, . . . , v, and v denotes the RI value;

wherein the set of channel state information is obtained according to M pieces of power information.

15. The method according to claim 11, further comprising:

sending a demodulation reference signal (DMRS) port to the first communication node according to the one set of channel state information, wherein the demodulation reference signal port and the M downlink measurement reference signal resources satisfy a quasi co-location relationship.

16. A first communication node, comprising:

at least one processor which, when executed, implements a channel state information sending method, and the method comprises:

determining M downlink measurement reference signal resources, wherein M is a positive integer greater than 1, and the M downlink measurement reference signal resources are all channel measurement resources;

determining one set of channel state information according to the M downlink measurement reference signal resources; and sending the one set of channel state information, wherein the determining the one set of channel state information according to the M downlink measurement reference signal resources comprises:

obtaining the one set of channel state information according to the M downlink measurement reference signal resources and M pieces of power information;

wherein the each piece of power information of the M pieces of power information comprises:

a power difference between energy per resource element (EPRE) corresponding to part of ports of a physical downlink shared channel (PDSCH) and EPRE of one downlink measurement reference signal resource, wherein the part of the ports of the PDSCH correspond to antenna ports of the one downlink measurement reference signal resource; and wherein the one downlink measurement reference signal resource is one downlink measurement reference signal resource of the M downlink measurement reference signal resources, the each piece of power information of the M pieces of power information corresponds to a respective one downlink measurement reference signal resource of the M downlink measurement reference signal resources, and the M pieces of power information are comprised in received first signaling information or are determined according to a predetermined rule.

* * * * *